United States Patent
Ishizuka et al.

(10) Patent No.: US 7,312,979 B2
(45) Date of Patent: Dec. 25, 2007

(54) STACKED SOLID ELECTROLYTIC CAPACITOR

(75) Inventors: Hidetoshi Ishizuka, Sannohe (JP); Minoru Funahashi, Sannohe (JP); Toshiyuki Mizutani, Sannohe (JP); Akira Ueda, Sannohe (JP); Katsuharu Yamada, Sannohe (JP)

(73) Assignee: Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 11/655,871

(22) Filed: Jan. 22, 2007

(65) Prior Publication Data

US 2007/0171598 A1    Jul. 26, 2007

(30) Foreign Application Priority Data

Jan. 23, 2006    (JP)    ............................ 2006-014467

(51) Int. Cl.
*H01G 9/10* (2006.01)
*H05K 5/03* (2006.01)

(52) U.S. Cl. ...................................... 361/537; 361/532

(58) Field of Classification Search ................ 361/523, 361/528, 532–540
See application file for complete search history.

(56) References Cited

U.S. PATENT DOCUMENTS

| 6,870,728 | B1 * | 3/2005 | Burket et al. ............... 361/538 |
| 6,977,807 | B2 * | 12/2005 | Arai et al. ................... 361/523 |
| 7,031,141 | B2 * | 4/2006 | Kuriyama ................... 361/528 |
| 7,206,193 | B2 * | 4/2007 | Nagasawa et al. .......... 361/535 |
| 2006/0193106 | A1 * | 8/2006 | Kobayashi et al. ......... 361/540 |
| 2006/0198083 | A1 * | 9/2006 | Kobayashi et al. ......... 361/540 |
| 2006/0285276 | A1 * | 12/2006 | Kuriyama ................... 361/523 |
| 2007/0159770 | A1 * | 7/2007 | Kuriyama ................... 361/528 |

FOREIGN PATENT DOCUMENTS

JP    2005-116713 A    4/2005

* cited by examiner

*Primary Examiner*—Eric Thomas
(74) *Attorney, Agent, or Firm*—Arent Fox LLP

(57) ABSTRACT

A stacked solid electrolytic capacitor has a substrate, a capacitor element, and a metal cap. The substrate has electrical conductivity. The capacitor element is provided on the substrate. The metal cap is coupled to the substrate, covers the capacitor element and is electrically conducted to the substrate. A cathode of the capacitor element is electrically conducted to the substrate.

12 Claims, 5 Drawing Sheets

STACKED SOLID ELECTROLYTIC CAPACITOR

BACKGROUND OF THE INVENTION

1. Field of the Invention

This invention generally relates to a stacked solid electrolytic capacitor.

2. Description of the Related Art

A solid electrolytic capacitor attracts attentions because the capacitor is superior in frequency property compared to other electrolytic capacitors. A roll-formed solid electrolytic capacitor, a stacked solid electrolytic capacitor and so on are used as the solid electrolytic capacitor. An exterior of the stacked solid electrolytic capacitor is, generally, molded with epoxy resin. There is, however, some defects with respect to the epoxy molding.

Transfer molding is, generally, used as an epoxy molding method. The epoxy resin is heated to more than 150 degrees C. and the epoxy resin is put into with a pressure of more than few atmospheres, in the method. Polymerized element is subjected to much stress. And it is possible that a leakage current is increased and electrical short circuit is generated. The epoxy resin of high temperature breaks into between electrode foils of the polymerized element. And the property is possibly degraded because of separation of a polymer.

And so, Japanese Patent Application Publication No. 2005-116713 (hereinafter referred to Document 1) discloses a molding method as a method other than the transfer molding. In the method, a thermocompression tape where a single liquid epoxy resin is impregnated is pasted to the polymerized element. And the epoxy resin dissolved with heat is molded.

It is, however, difficult to obtain humidity resistance because a molding material is epoxy resin, with respect to a solid electrolytic capacitor manufactured following the art of Document 1.

SUMMARY OF THE INVENTION

The present invention provides a thinned stacked solid electrolytic capacitor having high humidity resistance.

According to an aspect of the present invention, preferably, there is provided a stacked electrolytic capacitor including a substrate, a capacitor element, and a metal cap. The substrate has electrical conductivity. The capacitor element is provided on the substrate. The metal cap is coupled to the substrate, covers the capacitor element and is electrically conducted to the substrate. A cathode of the capacitor element is electrically conducted to the substrate.

With the above-mentioned configuration, the capacitor element is covered with the metal cap. The metal cap has high sealing performance, and shields against external environment. In this case, it is possible to obtain high humidity resistance. It is possible to restrain a degradation of property of the solid electrolytic capacitor. It is possible to reduce ESL of the solid electrolytic capacitor because the metal cap and the substrate act as a cathode.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
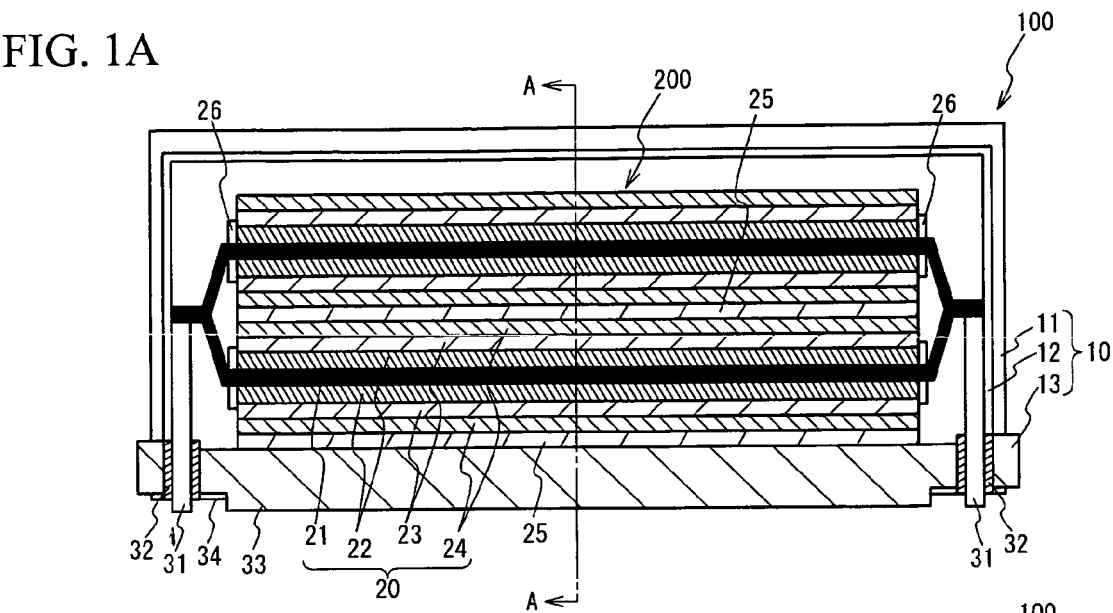
FIG. 1A through FIG. 1C illustrate a stacked solid electrolytic capacitor in accordance with a first embodiment of the present invention.
Figure 1B:
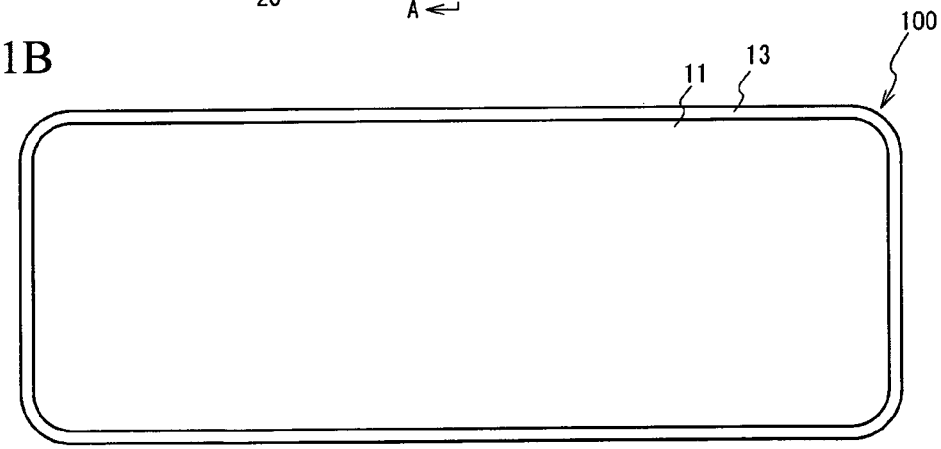
Figure 1C:
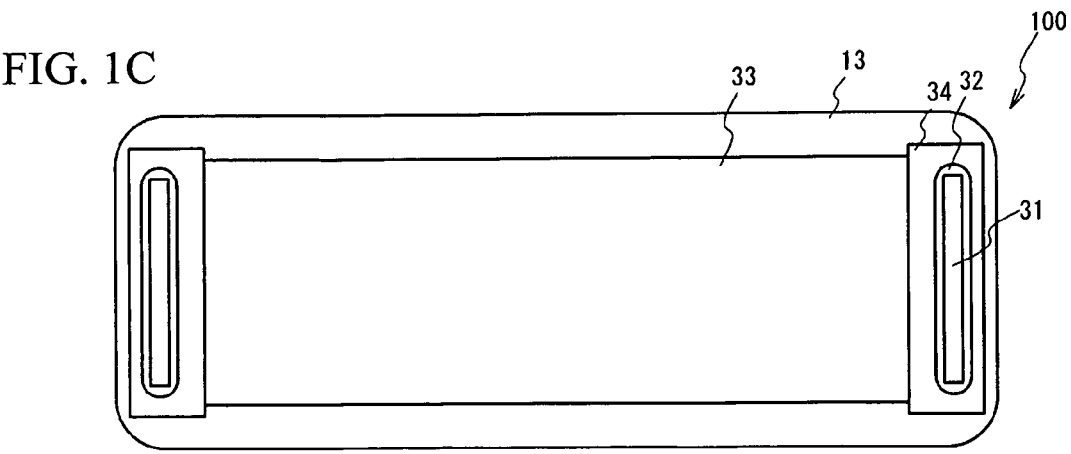

FIG. 1A through FIG. 1C illustrate a stacked solid electrolytic capacitor 100 in accordance with a first embodiment of the present invention. FIG. 1A illustrates a cross sectional view of the solid electrolytic capacitor 100. FIG. 1B illustrates a top view of the solid electrolytic capacitor 100. FIG. 1C illustrates a bottom view of the solid electrolytic capacitor 100. As shown in FIG. 1A, the solid electrolytic capacitor 100 has a structure in which a capacitor element 200 is packaged in a case 10.

As shown in FIG. 1A and FIG. 1B, the case 10 has a structure in which a metal cap 11 is provided on a base substrate 13. The metal cap 11 may be seam welded to the base substrate 13. The metal cap 11 is composed of a metal such as copper, aluminum, SPC steel, cobalt steel or stainless steel.

The base substrate 13 has electrical conductivity, can be soldered easily, and is composed of a material having low moisture permeability. The base substrate 13 is, for example, composed of a metal such as copper, aluminum, SPC steel, cobalt steel or stainless steel, or a ceramics having a metal layer plated on the surface thereof. An insulating layer 12 is coated on an inner face of the metal cap 11. And it is possible to restrain an electrical short circuit between the capacitor element 200 and the metal cap 11. The insulating layer 12 is, for example, composed of a resin, nylon, polyethylene terephthalate (PET) that have insulating property.

As shown in FIG. 1A and FIG. 1C, a through hole is formed near both ends of the base substrate 13. An anode terminal 31 is provided in one of the through holes, and another anode terminal 31 is provided in the other. An insulating material 32 is formed between the anode terminal 31 and the through hole. And it is possible to restrain an electrical short circuit between the anode terminal 31 and the base substrate 13.

The anode terminal 31 is composed of a conductive material that can be soldered easily. The anode terminal 31 is, for example, composed of SPC steel or cobalt steel. The anode terminal 31 is coupled to an extractor portion of an anode foil 21 mentioned later. The base substrate 13 has a convex portion 33 on a bottom face thereof between the through holes. The convex portion 33 acts as a cathode terminal, as mentioned later. An insulating sheet 34 is formed between the convex portion 33 and the anode terminal 31. It is therefore possible to restrain an electrical short circuit between the convex portion 33 and the anode terminal 31.

The insulating material 32 is, for example, composed of a glass such as a hard glass or a soft glass, or a rubber. The insulating material 32 is, preferably, composed of a soft glass, in a case where the base substrate 13 is composed of a material such as SPC steel having relatively high linear coefficient of thermal expansion. On the other hand, the insulating material 32 is, preferably, composed of a hard glass, in a case where the base substrate 13 is composed of a material such as cobalt steel having relatively low linear coefficient of thermal expansion. In these cases, it is possible to improve sealing performance of the case 10.

Figure 2:
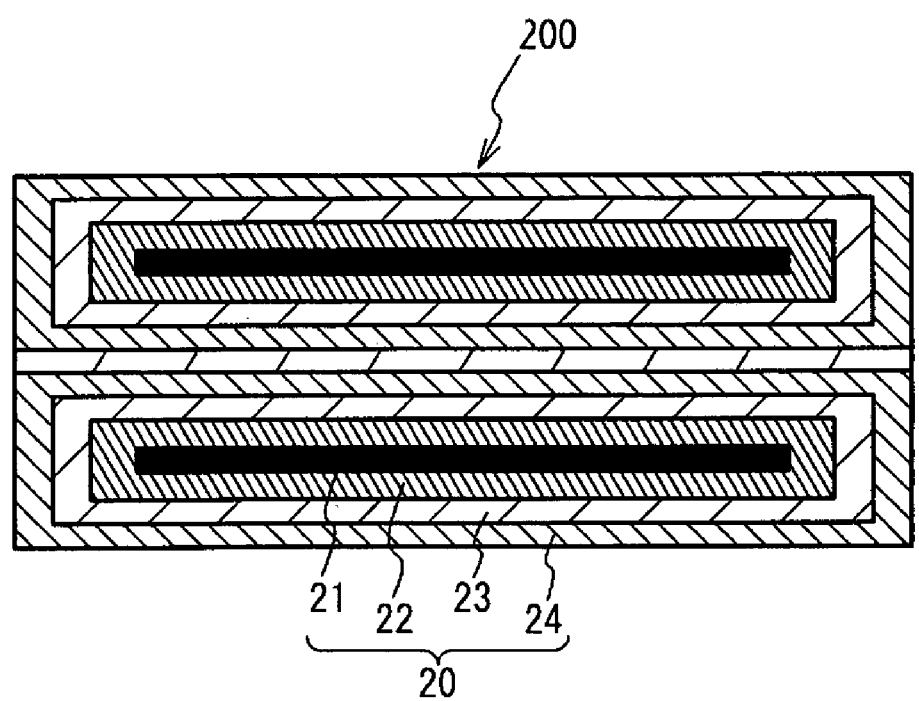
FIG. 2 illustrates a cross sectional view of a capacitor element taken along a line A-A of FIG. 1A.

Next, a description will be given of the capacitor element 200, with reference to FIG. 1A and FIG. 2. FIG. 2 illustrates a cross sectional view of the capacitor element 200 taken along a line A-A of FIG. 1A. As shown in FIG. 1A and FIG. 2, the capacitor element 200 has a structure in which a plurality of unit elements 20 are stacked. In the embodiment, the capacitor element 200 has a structure in which two unit elements 20 are stacked on the base substrate 13 by an adhesive agent 25 having electrical conductivity. It is possible to control the capacitance of the capacitor element 200 by controlling the stacking number of the unit element 20.

The adhesive agent 25 is composed of a conductive material such as silver. The unit element 20 has a structure in which a solid electrolyte layer 22, a carbon paste layer 23 and an extractor cathode layer 24 are stacked on the anode foil 21 in order. The anode foil 21 is composed of a valve metal having a dielectric oxide layer formed on a surface thereof. The valve metal used for the anode foil 21 is a metal such as aluminum. It is possible to form the dielectric oxide layer by subjecting the surface of the valve metal to an etching treatment and a chemical conversion treatment.

It is possible to form the anode foil 21 by cutting a valve metal having a dielectric oxide layer formed on a surface thereof into a given shape. In the cutting process, the valve metal at the end face of the anode foil 21 is exposed, and a defect is formed in the dielectric oxide layer. It is therefore necessary to form a dielectric oxide layer on the exposed valve metal. It is possible to form the dielectric oxide layer on the exposed valve metal by carrying out a chemical conversion treatment and a thermal treatment few times after the cutting. The chemical conversion treatment is carried out at a voltage near a formation voltage of the dielectric oxide layer, using chemical liquid mainly containing 0.5 wt % to 2 wt % ammonium adipate.

The solid electrolyte layer 22 has a separator. In the solid electrolyte layer 22, a solid electrolyte is formed in the separator and between the separator and the anode foil 21. The separator is mainly composed of synthetic fiber having more than one polymer fiber such as PET fiber or acrylic fiber. The solid electrolyte is composed of 3,4-polyethylene dioxythiophene (PEDT) or the like. It is possible to form the solid electrolyte by impregnating polymerizable monomers and an oxidizer into the separator. A description will be given of a forming method of the solid electrolyte.

A compound liquid including a monomer to be the solid electrolyte and an oxidizer is provided on the surface of the anode foil 21 and on the separator. The monomer is a compound solvent including a volatile solvent. Concentration of the monomer in the compound solvent is within a range 1 wt % to 50 wt %. The concentration is, preferably, within a range 10 wt % to 35 wt %. The oxidizer is contained in an alcohol solvent by 40 wt % to 60 wt %. In the embodiment, a solvent containing 60 wt % oxidizer is used. Next, the compound liquid on the anode foil and in the separator is subjected to a heat polymerization, and the solid electrolyte layer 22 is formed.

In addition, an insulating layer 26 is formed on an exposed area of the solid electrolyte layer 22. And it is prevented that the solid electrolyte exudes from the solid electrolyte layer 22. The insulating layer 26 is, for example, composed of an insulating synthetic resin such as silicon resin, epoxy resin, polyamide resin, or polyimide resin.

The extractor cathode layer 24 is, for example, composed of silver paste. In the embodiment, the extractor cathode layer 24 of the unit element 20 at lower side is electrically coupled to the base substrate 13 through the adhesive agent 25. And the base substrate 13 and the metal cap 11 act as a cathode.

The solid electrolytic capacitor 100 in accordance with the embodiment has a high humidity resistance, because the capacitor element 200 is sealed with the metal cap 11 and the base substrate 13 that have high sealing performance and shield against external environment. It is therefore possible to restrain property degradation of the solid electrolytic capacitor 100. Further, it is possible to reduce ESL of the solid electrolytic capacitor 100, because whole of the case 10 acts as a cathode.

Second Embodiment

Figure 3A:
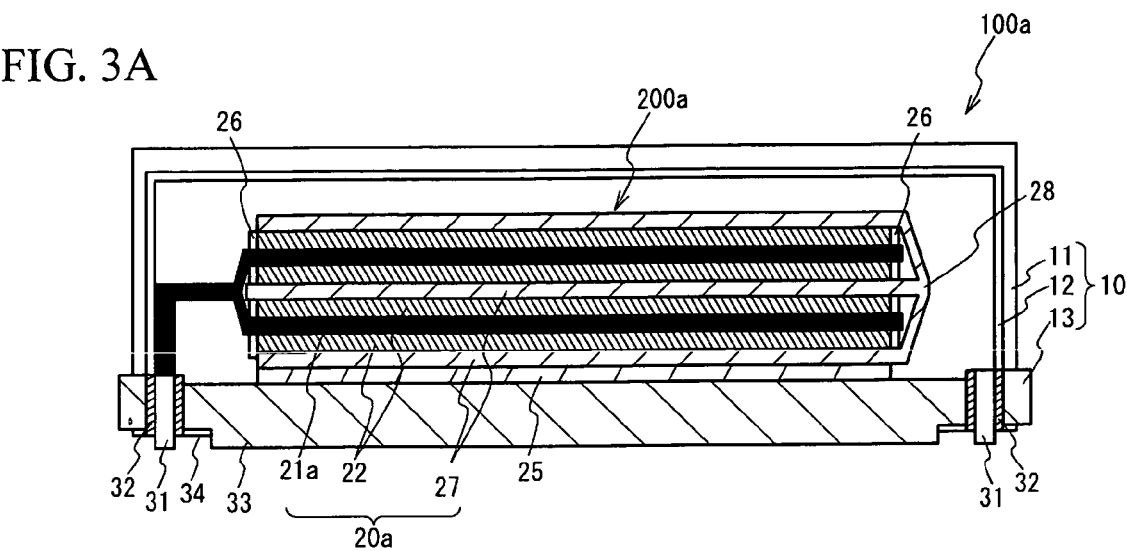
FIG. 3A through FIG. 3C illustrate a solid electrolytic capacitor in accordance with a second embodiment of the present invention.
Figure 3B:
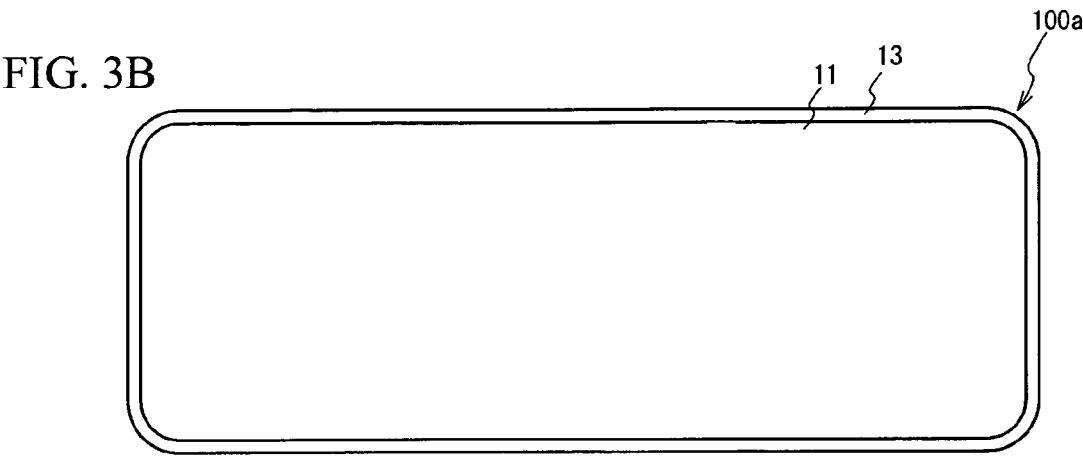
Figure 3C:
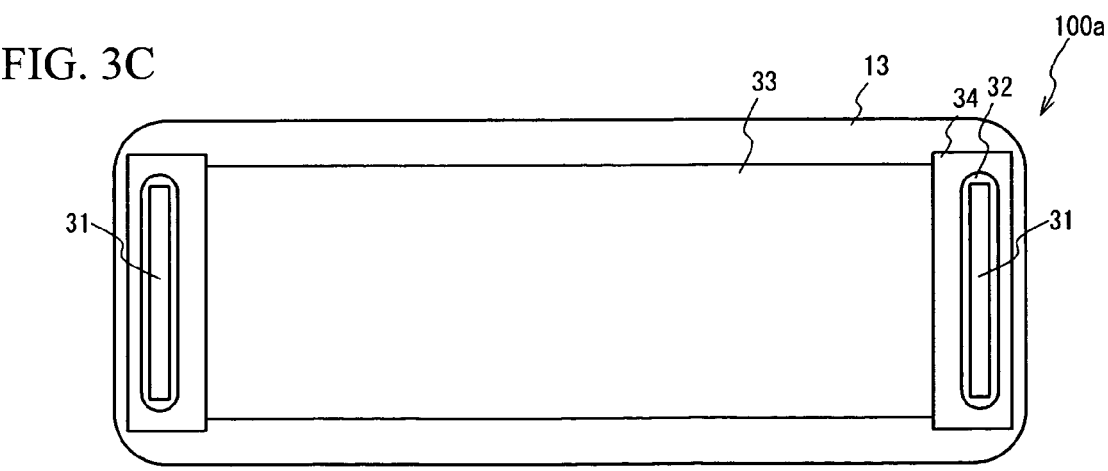

FIG. 3A through FIG. 3C illustrate a solid electrolytic capacitor 100a in accordance with a second embodiment of the present invention. FIG. 3A illustrates a cross sectional view of the solid electrolytic capacitor 100a. FIG. 3B illustrates a top view of the solid electrolytic capacitor 100a. FIG. 3C illustrates a bottom view of the solid electrolytic capacitor 100a. As shown in FIG. 3A through FIG. 3C, the solid electrolytic capacitor 100a has a capacitor element 200a instead of the capacitor element 200, being different from the solid electrolytic capacitor 100.

The capacitor element 200a has a structure in which a plurality of unit elements 20a are stacked. The unit element 20a has a structure in which the solid electrolyte layer 22 and a cathode foil 27 is stacked on the upper face and on the lower face of an anode foil 21a. Two unit elements 20a are stacked in the capacitor element 200a in the embodiment. The capacitor element 200a is adhered to the base substrate 13 with the adhesive agent 25. And the metal cap 11 and the base substrate 13 act as a cathode.

The anode foil 21a is different from the anode foil 21 in FIG. 1A in shape. Details are mentioned later. The cathode foil 27 is composed of a metal such as aluminum, tantalum or niobium. In the embodiment, the cathode foil 27 is aluminum foil. The surface of the cathode foil 27 is subjected to an evaporation process or a physical adsorption process of carbide. A carbide grain thus adsorbs to the surface of the cathode foil 27.

The metal composing the cathode foil 27 is in touch with the solid electrolyte layer 22, not directly by through the carbide of organic. And adhesiveness between the cathode foil 27 and the solid electrolyte layer 22 is improved. In addition, the solid electrolyte in the solid electrolyte layer 22 is formed effectively, because airspace between the carbide grains is larger than an etching pit of a normal oxide layer. The interference resistance between the cathode foil 27 and the solid electrolyte layer 22 is reduced, and tan δ and ESR are reduced. And the frequency property is improved.

The cathode foil 27, the carbide grain and the solid electrolyte layer 22 are electrically conducted to each other, when the solid electrolytic capacitor 100a is energized. Therefore, the electrical capacitance at anode side is that of the solid electrolytic capacitor 100a, because the carbide grain and the solid electrolyte layer 22 does not affect the capacitance of the cathode of the solid electrolytic capacitor 100a. It is possible to reduce the stacking number of the unit element 20a, because the capacitance of the solid electrolytic capacitor 100a is increased. And it is possible to reduce the thickness of the solid electrolytic capacitor 100a. It is possible to control the capacitance of the solid electrolytic capacitor 100a by controlling the stacking number of the unit element 20a.

The carbide grain is not limited and may be a material including carbon. The carbide grain is, for example, composed of carbon, graphite, carbon nitride, carbide or carbon compound. The carbide grain may be held by a whisker formed on the surface of the cathode foil 27.

An extractor portion is formed on the cathode foil 27. The extractor portion of each cathode foil 27 is coupled to each other through a welding portion 28. And each cathode foil 27 is coupled electrically. The welding portion 28 is formed with a laser welding, a resistance welding, or an ultrasonic welding. The anode foil 21 is coupled to the anode terminal 31 through the extractor portion.

Figure 4A:
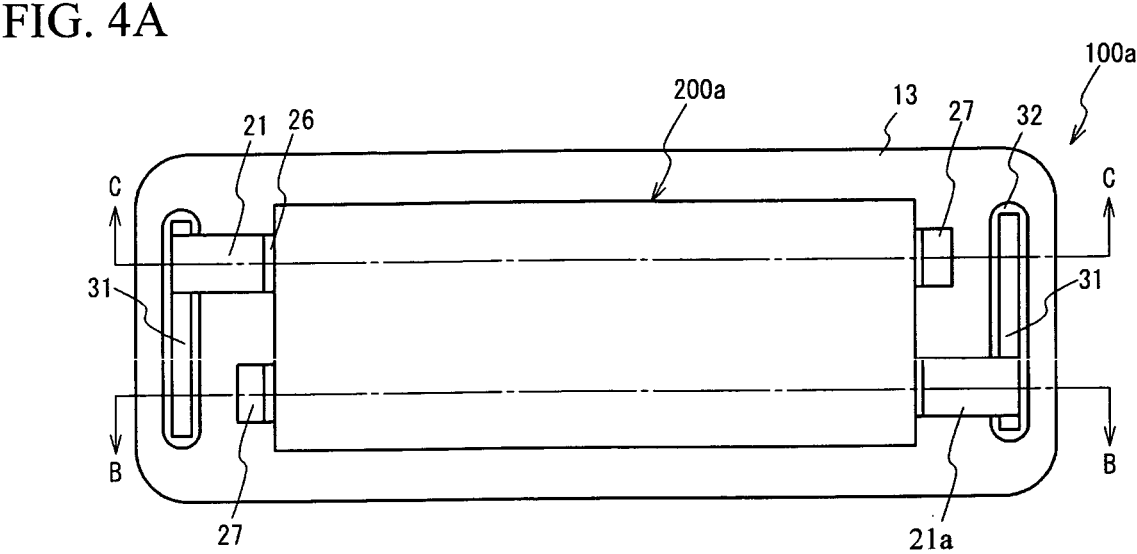
FIG. 4A through FIG. 4C illustrate a shape of an anode foil and a cathode foil.
Figure 4B:
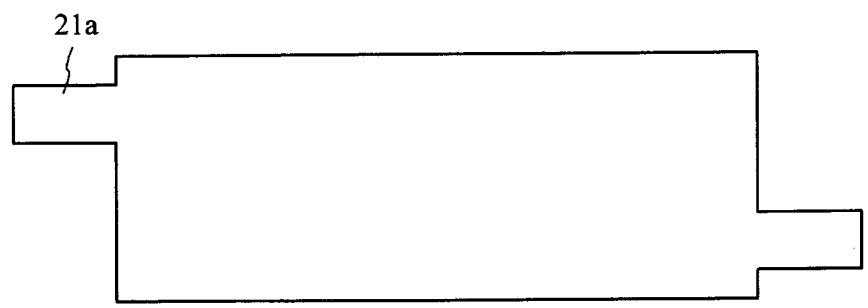
Figure 4C:
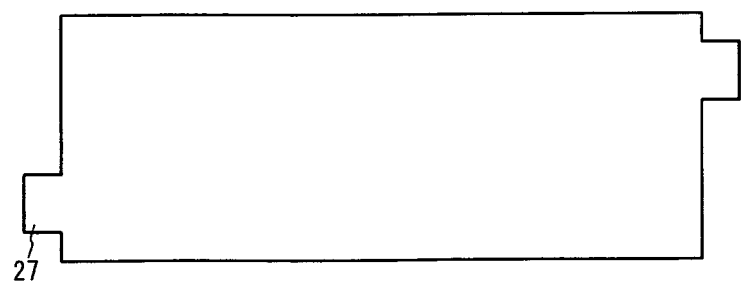
Figure 5:
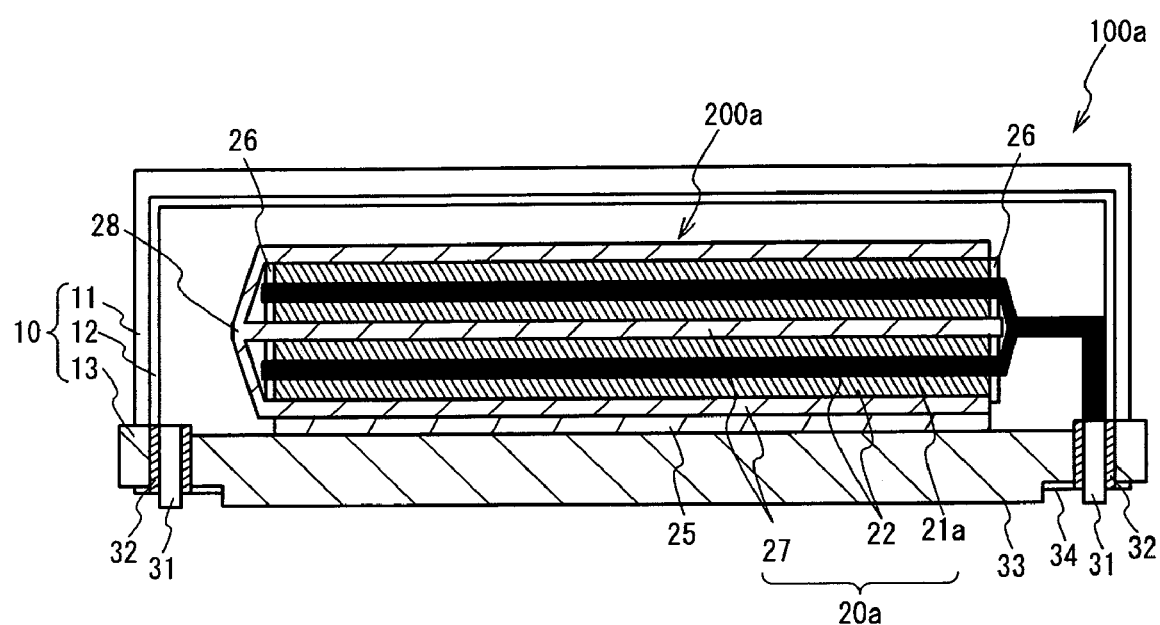
FIG. 5 illustrates a cross sectional view taken along a line B-B of FIG. 4A.

FIG. 4A through FIG. 4C illustrate a shape of the anode foil 21 and the cathode foil 27. FIG. 4A illustrates a perspective view of the solid electrolytic capacitor 100a viewing from upper side. FIG. 4B illustrates a top view of the anode foil 21a. FIG. 4C illustrates a top view of the cathode foil 27. As shown in FIG. 4B and FIG. 4C, the anode foil 21a and the cathode foil 27 are a foil having a plate shape. An extractor portion is formed integrally on each anode foil 21a and on each cathode foil 27. The extractor portion of the anode foil 21a and the extractor portion of the cathode foil 27 are arranged so as not to overlap when the extractor portions are viewed from a direction vertical to each foil. FIG. 3A mentioned above is a cross sectional view taken along a line C-C of FIG. 4A. FIG. 5 illustrates a cross sectional view taken along a line B-B of FIG. 4A.

The solid electrolytic capacitor 100a in accordance with the embodiment has a high humidity resistance, because the capacitor element 200a is sealed with the metal cap 11 and the base substrate 13 that have high sealing performance and shield against external environment. It is therefore possible to restrain property degradation of the solid electrolytic capacitor 100a. Further, it is possible to reduce ESL of the solid electrolytic capacitor 100a, because whole of the case 10 acts as a cathode.

EXAMPLES

Example 1

In an example 1, the solid electrolytic capacitor 100 shown in FIG. 1A through FIG. 1C was fabricated. Aluminum foil, which was subjected to an etching treatment and a chemical conversion treatment, was used as the anode foil 21. The aluminum foil was cut out into the anode foil 21. The anode foil 21 was subjected to a chemical conversion treatment at a voltage near a formation voltage of the dielectric oxide layer of the anode foil 21 using chemical liquid mainly containing 0.5% to 2% ammonium adipate by weight, and was subjected to a thermal treatment in a temperature range 200 degrees C. to 280 degrees C. The thickness of the anode foil 21 was 100 μm to 110 μm.

Next, the solid electrolyte layer 22 was formed on both faces of the anode foil 21. A solvent containing 25 wt % monomer and a solvent containing 60 wt % oxidizer were provided on the both faces of the anode foil 21 and in the separator. The solvents were heated from 30 degrees C. to 150 degrees C. The thickness of the solid electrolyte layer 22 was 30 μm to 50 μm.

After that, the carbon paste layer 23 and the extractor cathode layer 24 were formed on the solid electrolyte layer 22. The insulating layer 26 was formed on both ends of the solid electrolyte layer 22. And the unit element 20 was fabricated. The thickness of the carbon paste layer 23 was less than 10 μm. Silver paste was used as the extractor cathode layer 24. Two unit elements 20 were stacked on the base substrate 13 by the adhesive agent 25, and the capacitor element 200 was fabricated. Silver was used as the adhesive agent 25.

After that, the anode foil 21 was coupled to the anode terminal 31. The capacitor element 200 was covered with the metal cap 11. The base substrate 13 was coupled to the metal cap 11 with projection welding. The height of the metal cap 11 was 1.7 mm. The base substrate 13 and the anode terminal 31 were composed of cobalt steel. The insulating material 32 was composed of hard glass. The thickness of the base substrate 13 was 0.7 mm. The capacitance of the solid electrolytic capacitor in accordance with the example 1 was 2.5 V 1000 μF.

Example 2

In an example 2, the solid electrolytic capacitor 100a shown in FIG. 3A through FIG. 5 was fabricated. Aluminum foil, which was subjected to an etching treatment and a chemical conversion treatment, was used as the anode foil 21a. The thickness of the anode foil 21a was 100 μm to 110 μm. The aluminum foil was cut out into the anode foil 21a. Aluminum foil having a carbide grain held at the surface thereof and having a thickness of 50 μm was used as the cathode foil 27. The aluminum foil was cut out into the cathode foil 27. Next, the anode foil 21a was subjected to a chemical conversion treatment at a voltage near a formation voltage of the dielectric oxide layer of the anode foil 21a using chemical liquid mainly containing 0.5% to 2% ammonium adipate by weight, and was subjected to a thermal treatment in a temperature range 200 degrees C. to 280 degrees C.

Next, the solid electrolyte layer 22 was formed on one surface of the anode foil 21a. A solvent containing 25 wt % monomer and a solvent containing 60 wt % oxidizer were provided on the both faces of the anode foil 21a and in the separator. The solvents were heated from 30 degrees C. to 150 degrees C. The thickness of the solid electrolyte layer 22 was 30 μm to 50 μm.

After that, the cathode foil 27 was pasted to the solid electrolyte layer 22, and the unit element 20a was fabricated. A plurality of the unit elements 20a were stacked with an adhesive agent, and the capacitor element 200a was fabricated. After that, the anode foil 21a was coupled to the anode terminal 31, and each extractor portion of the cathode foil 27 was coupled with ultrasonic welding. The capacitor element 200a was covered with the metal cap 11. The base substrate 13 was coupled to the metal cap 11 with projection welding. The height of the metal cap 11 was 1.7 mm. The base substrate 13 and the anode terminal were composed of cobalt steel. The insulating material 32 was composed of hard glass. The thickness of the base substrate 13 was 0.7 mm. The capacitance of the solid electrolytic capacitor in accordance with the example 2 was 2.5 V 1000 μF.

Comparative Example

In a comparative example, the capacitor element 200 in accordance with the example 1 was attached to a conventional lead frame. The capacitor element was covered with epoxy resin by transfer molding, and a solid electrolytic capacitor was fabricated. The capacitance of the solid electrolytic capacitor in accordance with the comparative example was 2.5 V 1000 μF.

(Analysis)

Table 1 shows an electrical capacitance, the tan δ, the leakage current, and the ESR of the solid electrolytic capacitors in accordance with the examples 1 and 2 and the comparative example. Thirty capacitors in accordance with the examples 1 and 2 and the comparative example were fabricated, and each value in Table 1 shows average value thereof.

TABLE 1

| | Electrical capacitance (μF) | tanδ (%) | Leakage current (μA/2 minutes) | ESR (mΩ) |
|---|---|---|---|---|
| Example 1 | 1084 | 2.7 | 165 | 2.3 |
| Example 2 | 1108 | 1.9 | 158 | 2.2 |
| Comparative example | 987 | 3.5 | 213 | 4.3 |

As shown in table 1, with respect to the solid electrolytic capacitors in accordance with the examples 1 and 2, the electrical capacitance was increased, and the tan δ, the leakage current and the ESR were reduced considerably, compared to the solid electrolytic capacitors in accordance with the comparative example. In particular, the leakage current was reduced considerably. This is because the capacitor element was sealed with the metal case and the base substrate.

Next, the property change of the solid electrolytic capacitor in accordance with the examples 1 and 2 and the comparative example was shown in Table 2, in a case where the capacitors were left at 90 degrees C., in an atmosphere of 95 Rh %, for 1000 hours.

TABLE 2

| | | Rate of electrical capacitance change (μF) | tanδ (%) | Leakage current (μA/ 2 minutes) | ESR (mΩ) |
|---|---|---|---|---|---|
| Example 1 | Initial | | 2.7 | 165 | 2.3 |
| | After 1000 Hr | −1.23 | 3.1 | 231 | 2.8 |
| Example 2 | Initial | | 1.9 | 158 | 2.2 |
| | After 1000 Hr | −1.89 | 2.7 | 224 | 2.6 |
| Comparative example | Initial | | 3.5 | 213 | 4.3 |
| | After 1000 Hr | — | — | short | — |

As shown in Table 2, all of the solid electrolytic capacitors in accordance with the comparative example shorted out. It was not possible to measure the capacitance, the tans and the ESR. On the other hand, the capacitance, the tans, the ESR and the leakage current were not changed remarkably, with respect to the electrolytic capacitors in accordance with the examples 1 and 2. This is because the capacitor element was sealed with the metal case and the base substrate, and the humidity resistance in a condition of high temperature and high humidity was improved.

While the preferred embodiments of the prevent invention have been illustrated in detail, the invention is not limited to the specific embodiments above. In addition, it will be appreciated that the invention is susceptible of modification, variation and change without departing from the proper and fair meaning of the accompanying claims.

The present invention is based on Japanese Patent Application No. 2006-014467 filed on Jan. 23, 2006, the entire disclosure of which is hereby incorporated by reference.

What is claimed is:

1. A stacked solid electrolytic capacitor comprising:
   a substrate having electrical conductivity;
   a capacitor element provided on the substrate; and
   a metal cap that is coupled to the substrate, covers the capacitor element and is electrically conducted to the substrate,
   wherein a cathode of the capacitor element is electrically conducted to the substrate.

2. The stacked solid electrolytic capacitor as claimed in claim 1, wherein the metal cap is welded to the substrate.

3. The stacked solid electrolytic capacitor as claimed in claim 1, wherein:
   the substrate is composed of a metal or a ceramics having a metal formed on a surface thereof, has a cathode terminal and has at least a through hole; and
   the stacked solid electrolytic capacitor further comprises an anode terminal extracted outside from an anode of the capacitor element through the through hole.

4. The stacked solid electrolytic capacitor as claimed in claim 3, further comprising an insulating material provided between the substrate and the anode terminal in the through hole.

5. The stacked solid electrolytic capacitor as claimed in claim 4, wherein the insulating material is composed of a glass or a rubber.

6. The stacked solid electrolytic capacitor as claimed in claim 3, further comprising an insulating layer provided between the anode terminal and the cathode terminal at a bottom face of the substrate.

7. The stacked solid electrolytic capacitor as claimed in claim 1, further comprising an insulating layer formed on an inner face of the metal cap.

8. The stacked solid electrolytic capacitor as claimed in claim 1, wherein:
   the capacitor element has a unit element in which a solid electrolyte layer having a separator, a carbon paste and an extractor cathode layer are formed on a surface of an anode foil in order,
   the anode foil being composed of a valve metal; and
   the substrate is electrically conducted to the extracting cathode layer.

9. The stacked solid electrolytic capacitor as claimed in claim 8, wherein:
   the capacitor element has a structure in which a plurality of the unit elements are stacked; and
   the extractor cathode layer of the bottom one of the unit elements is electrically conducted to the substrate.

10. The stacked solid electrolytic capacitor as claimed in claim 1, wherein:
    the capacitor element having a structure in which a solid electrolyte layer having a separator and a cathode foil are formed on both faces of an anode foil composed of a valve metal in order,
    the cathode foil holding carbide grain on a face thereof on the side of the solid electrolyte layer; and
    the substrate is electrically conducted to the cathode foil.

11. The stacked solid electrolytic capacitor as claimed in claim 10, wherein the cathode foil of each unit element is electrically conducted to each other.

12. The stacked solid electrolytic capacitor as claimed in claim 10, wherein:
    the capacitor element has a structure in which a plurality of the unit elements are stacked; and
    the cathode foil of each unit element is electrically conducted to each other.

* * * * *